(12) United States Patent
Brodersen et al.

(10) Patent No.: US 6,850,895 B2
(45) Date of Patent: Feb. 1, 2005

(54) ASSIGNMENT MANAGER

(75) Inventors: Robert A. Brodersen, Redwood Shores, CA (US); Prashant Chatterjee, Saratoga, CA (US); Peter Siam Sy Lim, III, Redwood City, CA (US); Matthew S. Malden, San Francisco, CA (US); Duane Wandless, Bloomsbury, NJ (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 09/866,879

(22) Filed: May 30, 2001

(65) Prior Publication Data

US 2002/0029161 A1 Mar. 7, 2002

Related U.S. Application Data

(63) Continuation of application No. PCT/US99/28426, filed on Nov. 30, 1999.
(60) Provisional application No. 60/110,269, filed on Nov. 30, 1998.

(51) Int. Cl.[7] ............................................. G06F 17/60
(52) U.S. Cl. ......................................................... 705/9
(58) Field of Search ........................................ 705/8, 9

(56) References Cited

U.S. PATENT DOCUMENTS

| | | | |
|---|---|---|---|
| 5,440,681 A | | 8/1995 | Kudo |
| 5,765,140 A | * | 6/1998 | Knudson et al. ............... 705/9 |
| 5,797,129 A | | 8/1998 | Rohan |
| 5,913,201 A | * | 6/1999 | Kocur ......................... 700/101 |
| 5,963,911 A | | 10/1999 | Walker et al. |
| 6,014,664 A | * | 1/2000 | Fagin et al. ..................... 707/3 |
| 6,049,776 A | * | 4/2000 | Donnelly et al. ........... 700/100 |
| 6,101,480 A | | 8/2000 | Conmy et al. |
| 6,134,530 A | * | 10/2000 | Bunting et al. ........ 379/220.01 |

FOREIGN PATENT DOCUMENTS

EP   0 273 742   *   7/1988

OTHER PUBLICATIONS

ICL Offers to Sort Out Your Personnel for You with New Enterprisehr Service, Computergram International, n 2631, Mar. 27, 1995.*

Tipgos, Manual A. et al, Stress and the Emerging Legal Liability Through Workers' Compensation: Some Suggestions for Management Action, Journal of Applied Business Research, v8, n4 pp. 50–58, Fall 1992.*

* cited by examiner

Primary Examiner—F. J. Bartuska
(74) Attorney, Agent, or Firm—James W. Soong; Perkins Coie LLP

(57) ABSTRACT

A method, a program product, and a system for assigning resources to tasks in a rule based, resource constrained system. This is done by receiving as inputs tasks and task attributes; resources and resource attributes; and assignment rules. These inputs are used to searching a database of tasks, task attributes, and assignment rules thereof, to search a database of resources including resource attributes thereof, and to retrieve resources based upon the resource attributes. Resources are assigned to tasks based upon matches and scores of the resource attributes, the task attributes, and the assignment rules.

70 Claims, 10 Drawing Sheets

Figure 1:
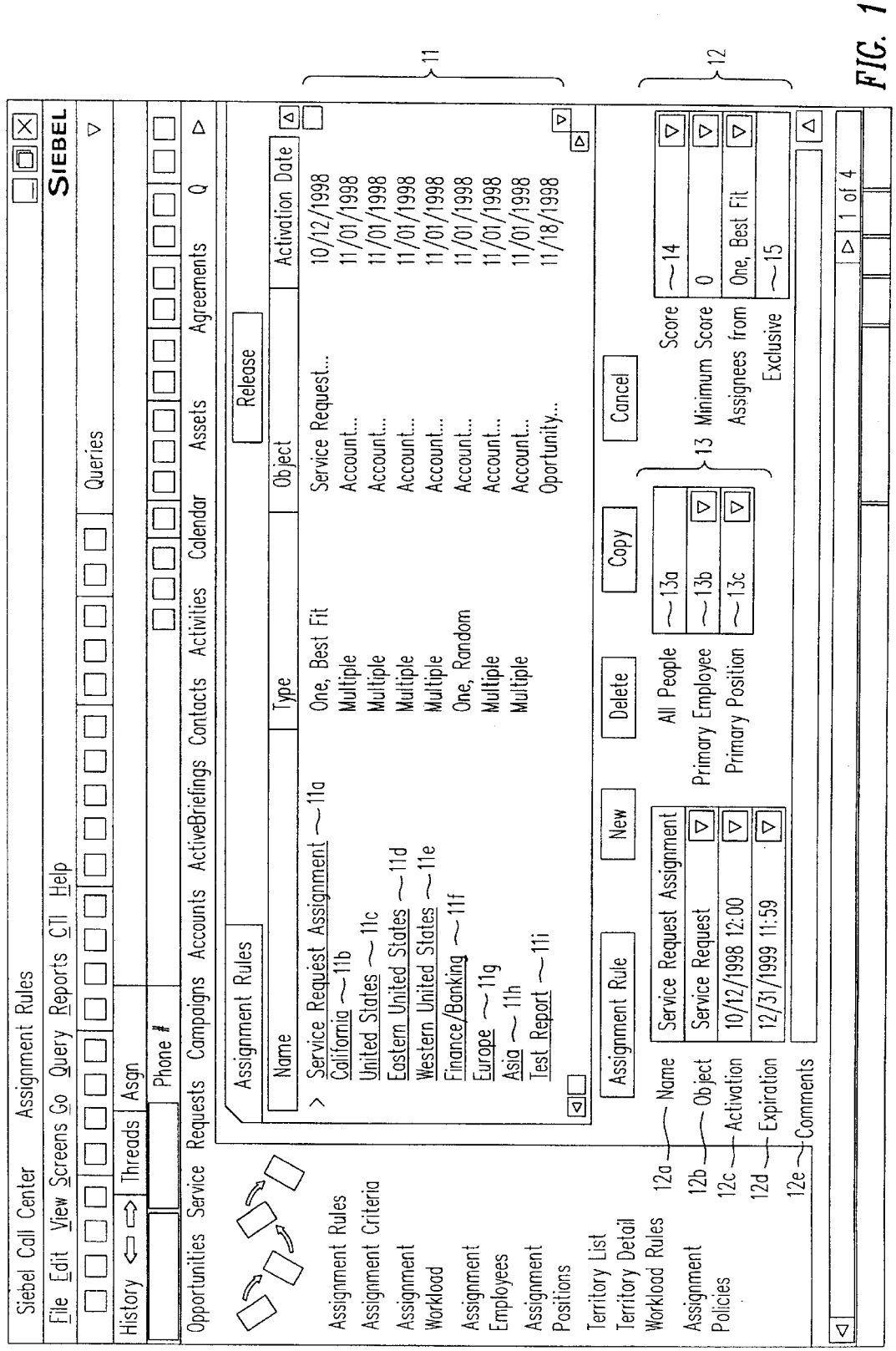

| Siebel Call Center | Assignment Rule | Positions View | | □ □ × |
|---|---|---|---|---|
| File Edit View Screens Go Query Reports CTI Help | | | | SIEBEL |

History ⇔ ⇨ | Threads | Asgn Rules
Phone #                                                                    Queries ▽

Opportunities Service Requests Campaigns Accounts ActiveBriefings Contacts Activities Calendar Assets Agreements ⚲

Assignment Rules
Assignment Criteria
Assignment Workload
Assignment Employees
Assignment Positions
Territory List
Territory Detail
Workload Rules
Assignment Policies

| Assignment Rule | | New | Delete | Copy | Cancel | |
|---|---|---|---|---|---|---|
| Name | California | | | All People ▽ | | Score |
| Object | Account | ▽ | | Primary Employee ▽ | | Minimum Score | 10 |
| Activation | 11/01/1998 12:00 | | | Primary Position ▽ | Field Sales Rep ▽ | Assignees from | Multiple |
| Expiration | 12/31/1999 12:00 | | | | | Exclusive | |
| Comments | | | | | | | |

Assignment Rule Position

| Position | Division | Parent Position | Position Type |
|---|---|---|---|
| > Division Manager–West | Performance Computer Systems, Inc. | Director of Field Operations | Manager |
| Telemarketing Representative–West | Performance Computer Systems, Inc. | Director of Telemarketing | Director |
| Field Sales Representative–Bay Area | Performance Computer Systems, Inc. | VP Sales | Sales Rep. |
| 51a | 51b | 51c | 51d |

⟨ 51 ⟩

△ 3 of 4 ▽

All Attributes 71

| Attribute | Type | Picklist | Object Mapping | Use Range |
|---|---|---|---|---|
| Product | Text | | | |
| Product Line | Text | | | |
| Postal Code | Number | | | |
| SIC | Number | | | |
| City | Text | | | |
| State | Text | | | |
| Country | Text | | | |

71a  71b  71c  71d  71e

73

| Object | Column |
|---|---|
| Opportunity | Opportunity Product |
| Service Request | Affected Product |

73a  73b

All Categories 75

| Category | Attributes |
|---|---|
| Full Address | (MVG) |

| Siebel Call Center — Employee Skills | □ □ ⊠ |
|---|---|
| File Edit View Screens Go Query Reports CTI Help | SIEBEL |

History ⇐ ⇒ | Threads | Employee ▽
                              | Phone # |

Opportunities  Service  Requests  Campaigns  Accounts  ActiveBriefings  Contacts  Activities  Calendar  Assets  Agreements  Queries All Employees

Employee

| Last Name | Conway | First Name | Chris | MI | | Division | Software Support Group |
| Job Title | Call Center Agent | Responsibility | Universal Agent ▽ | | Address | 4005 Bohannon Drive |
| Position | Call Center Agent ▽ | Territory | ▽ | | City | Menlo Park | State | CA |
| Work # | (415) 555-1501 | Fox # | (415) 555-2090 | | Zip | 94025 | Country | USA |
| Login Name | CCONWAY | E-mail | cconway@pcs.com | | | | | |

Employee Skills

| Skill | Comments |
|---|---|
| Revenue | |
| Language Code ~81a | |

Employee Skill Items ~81b

| Language | Experience |
|---|---|
| ENU | Expert |
| FRA ~81c | Expert ~81d |
| ESP | Expert |

Employees
Employees
Employee Exception Hours
Employee Skills
Employee Tools
Employee Assignment Rules

} 81

4 of 4

ASSIGNMENT MANAGER

This application is a continuation application of PCI application no. PCT/US99/28426, filed Nov. 30, 1999, itself claiming the benefit of the filing date of U.S. provisional application no. 60/110,269 filed Nov. 30, 1998, each above identified application being incorporated in its entirety, into the present application, by reference.

FIELD OF THE INVENTION

This invention relates to assignment management resource allocation methods and systems for matching resources, such as employees, with the needs of a business, and more specifically to a method, and a system for assigning resources in a rule based, resource constrained system.

BACKGROUND OF THE INVENTION

In many lines of business, person-to-person interactions are critical. Each person brings with them a set of knowledge bases, skill sets, experiences, and understanding that is unique to them. Similarly, many tasks, be they human interactions or human-machine interactions, require a specific set of human knowledge bases, skill sets, experiences, and understanding that may be unique to a small set of people, and only partially possessed by a larger set of persons. Matching the specific person to the specific task in such a way that the individual and global degrees of mismatch in an organization are minimized is a challenge for management. However, effectively managing an enterprise by managing information via a Front Office application requires properly matched individual employees to take ownership for tasks such as service requests, sales opportunities, contacts, accounts and other entities.

In a service organization, service requests are often resolved by the first customer service representative who talks with a customer. However, this initial attempt at resolution may be far from satisfactory, and when the request cannot be resolved or when the service request is logged via the Internet, ownership must be transferred to a service representative who can give the appropriate attention and expertise to the request and provide a timely and complete resolution. It is time-consuming and ineffective to resolve ownership by frequent management intercession, or by simply yelling out a call for assistance in a telephone service center.

Likewise, in a sales organization, opportunities must be routed to the individual or team of sales reps and sales consultants who are responsible for following up on the lead. This assignment must be based upon such factors as product knowledge, knowledge of the customer, and, previous relationships with the customer. Moreover, this assignment must take place quickly and seamlessly so that sales reps can effectively respond to potentially revenue-generating opportunities.

Proper assignment means objects (as tasks, service requests, sales leads, or the like, which are referred to collectively and interchangeably as "tasks") are allocated to the closest, most available, and most knowledgeable people or teams of people. Assignment may require either assigning employees or positions, that is a role within an organization that one or more employees are assigned to, to a task. Assignment is based on a wide variety of criteria including attributes of the employee or position (e.g. telephone status, calendar availability, workload) as well as matches between the attributes of the task and attributes of the employee or position (e.g. product skill, language expertise), and matches between attributes of the task assigned (e.g. Opportunity, Service request) and a pre-defined set of enumerated attribute values.

Employees have expertise on certain products and possibly specific product versions and upgrades. This expertise changes over time as employees gain new skills and experience, and as new products are released. Maintaining and providing an up-to-date skills matrix or database in the system is critical for both service representatives and the automated assignment processes, both of which need the most complete product information for determining who should handle service calls. Assigning service requests to people without product expertise causes customers to lose confidence, employees to become frustrated, and for service center productivity to decline.

For assignment of critical or important tasks, knowing employee availability is also critical to ensuring a task does not sit idle while someone is unavailable. Agent availability can include the current indicated availability (vacation, lunch, etc.) or the telephony availability (talking, wrap up mode, etc.)

Overloading any service representative with too many work items leads to longer resolution times for those work items. Taking into account an existing workload before assigning tasks can provide better load balancing, and therefore more predictable turnaround times.

Lastly, because of the complexity of tasks in a service or sales organization, which require the efforts of more than a single individual to resolve, assignment of tasks may be to teams of persons (employees or positions) For such type of assignments, known as team assignments, a primary person is calculated by assignment manager, by means of scoring the closeness of the match of each assigned person to perform the task at hand, and selecting the closest matching person as the primary person on the team.

For field service representatives, assignment includes scheduling. Once the optimal employee is assigned, the visit may be scheduled on his/her calendar.

In order to accomplish these ends, a clear need exists for an assignment manager method, system, and program product to optimally or sub-optimally match resources with needs and opportunities in a constrained environment, for example, to match resources, such as employees with specific skill sets, with customer, client, and sales lead needs and opportunities.

There is a further need to carry out matching in a constrained environment where finite resources, including employee skill sets and product expertise, and employee workload and availability constrain the assignment or matching process.

Thus, there is a clear need to carry out assignment matching in a "Rule Based" system that balances resources, needs and opportunities, and constraints.

SUMMARY OF THE INVENTION

The assignment manager method and system of our invention matches resources, such as employees and employee skill sets, with needs. This is carried out in a "Rule Based" system within a constrained environment. Resources, such as employees, are matched with constraints, such as skill sets, employee product expertise, language skills. Constraints include, among others, workload, employee availability, limitations on employee skill sets and product expertise, employee language skills, among others.

In one embodiment we provide a method, a system, and a program product for assigning resources to tasks in a rule based, resource constrained system. The method comprises of receiving as input (i) tasks and task attributes, (ii) resources and resource attributes; and (iii) assignment rules. The next step is searching a database of tasks, task attributes, and assignment rules for the tasks, and also searching a database of resources including resource attributes. The task and resource attributes are matched and resources are retrieved based upon the resource attributes, and the resources assigned to tasks based upon the resource attributes, the task attributes, and the assignment rules.

The searching and assigning process includes finding assignment rules for a task, evaluating these assignment rules for the task, and determining at least one candidate for each assignment rule that satisfies the task's attributes with respect to each assignment rule. Next, each candidate is evaluated against the assignment rule criteria, and each qualified candidate is scored for each assignment rule. The assignment rules are applied to scored candidates to generate a list of assignees. Next, exclusive assignment rules, if any, are evaluated, and highest scoring assignment rule is determined. This ranking is used to determine the primary assignee from the highest scoring assignment rule. This is continued to generate assignments of resources to tasks.

The method can be implemented by finding all of the assignment rules for a task. It can also be carried out by evaluating all of the assignment rules that satisfy a particular task's attributes. This could include determining assignment candidates based upon one or more of: (i)position based assignment; (ii) employee based assignment, (iii) all people assignment, (iv) task rules matching task attributes with criteria in the rules, (v) "compare task to person" rules matching task attributes with employee or position attributes and/or skills, (vi) person rules matching person's attributes and/or skills with criteria in rules; (vii) workload rules; (viii) calendar availability rules; (ix) CTI availability rules; and (x) geographic proximity rules.

In the method of the invention, the assignment criteria are one or more of: (i) composite criteria having multiple attributes; (ii) criteria having a finite range; (iii) criteria having one or more wild cards; and (iv) criteria having an expertise code.

Each assignment candidate may be reviewed based upon one or more of: (i) removing all candidates that do not satisfy all required criteria; and/or (ii) removing all candidates that have a workload greater that a pre-assigned maximum workload.

Additionally, according to the method of the invention, each qualified candidate for each assignment rule based upon one or more of: (i) the sum of all assignment criteria that satisfy the task's attributes; (ii) the expertise weight score of the candidate; (iii) the score of the candidate; and (iv) the workload score.

In a further aspect of the method of the invention a list of assignees is generated based upon one or more of: (i) keeping all candidates with an assignment score greater then or equal to the assignment rules' minimum score; (ii) keeping all candidates having an attribute meeting the assignment rule; (iii) choosing a random candidate meeting the assignment rule; and (iv) choosing the candidate having the highest assignment score.

In one exemplification of the invention the highest scoring assignment rule is the primary assignment rule. This is extensible to selecting as the assignee the candidate assignee having the highest score for the primary assignment rule.

A further aspect of the method of our invention is writing the primary assignment rule and the primary assignee to the task's table.

In the method of our invention individuals may be assigned to tasks in one or more of a one best fit, a random fit, or a round robin fit. Additionally, teams may be assigned to tasks, with a primary person in the team.

In a still further exemplification of the method of our invention the closest fitting assignee is assigned to the task.

The method of our invention allows the user to configure the task attributes, extend the task attributes, dynamically define assignment rules, assign tasks in the background real time and interactively, or dynamically.

A further aspect of our invention is a system for assigning resources to tasks responsive to user inputs of one or more of tasks or resources in a rule based, resource constrained system. The system has a database of tasks, task attributes, and assignment rules, as well as a database of resources including resource attributes, and a database management system for retrieving resources based upon the resource attributes. In the system of the invention there is an assignment engine for assigning resources to tasks based upon the resource attributes, the task attributes, and the assignment rules. The system is adapted to assign resources to tasks by the above described method.

A still further exemplification of our invention is a program product including one or more program storage device or devices residing on one or more computers, and having computer readable program code for assigning resources to tasks in a rule based, resource constrained system by a method of the type described above.

THE FIGURES

The invention may be understood by reference to the Figures appended hereto.

Figure 2:
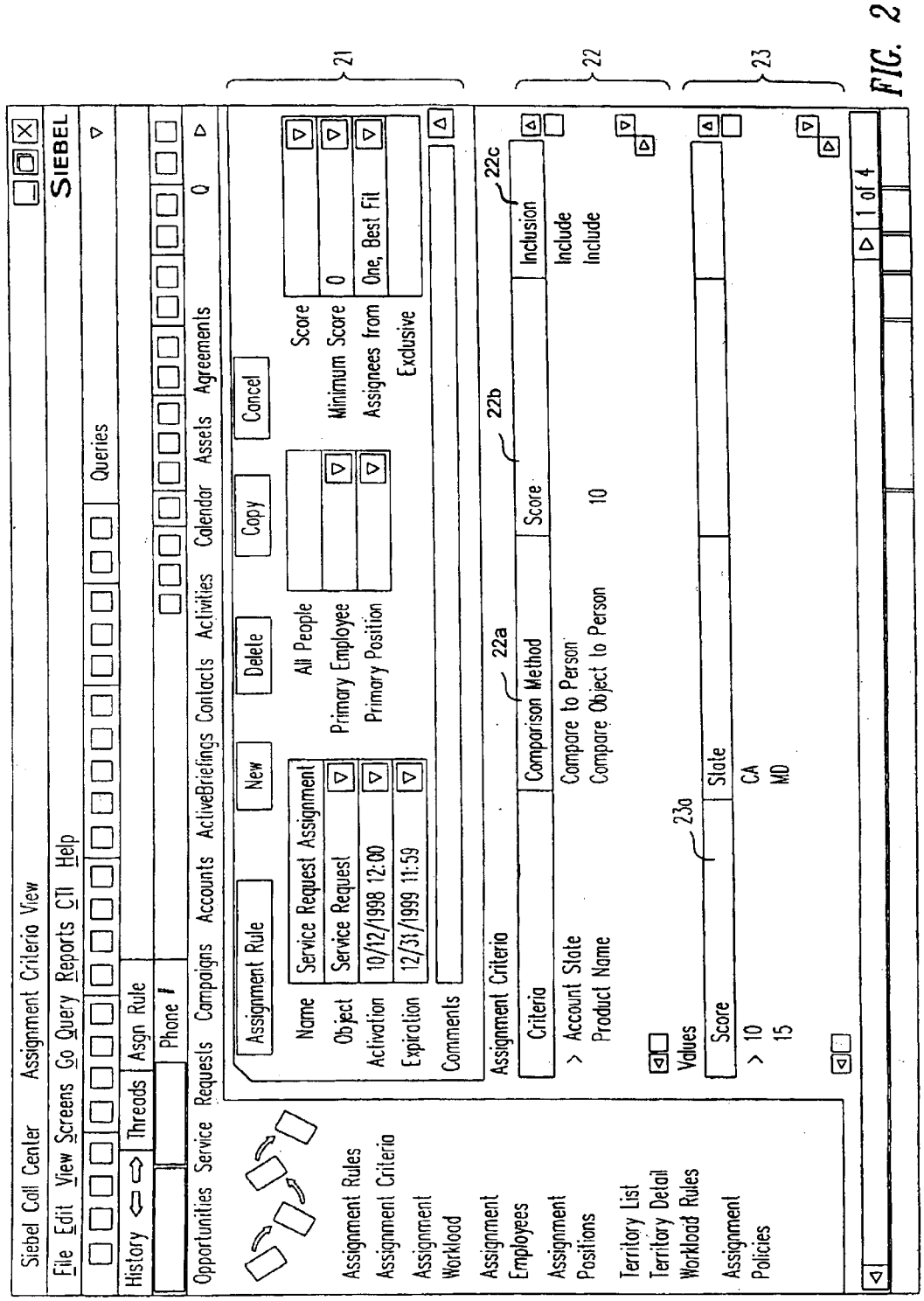
Figure 3:
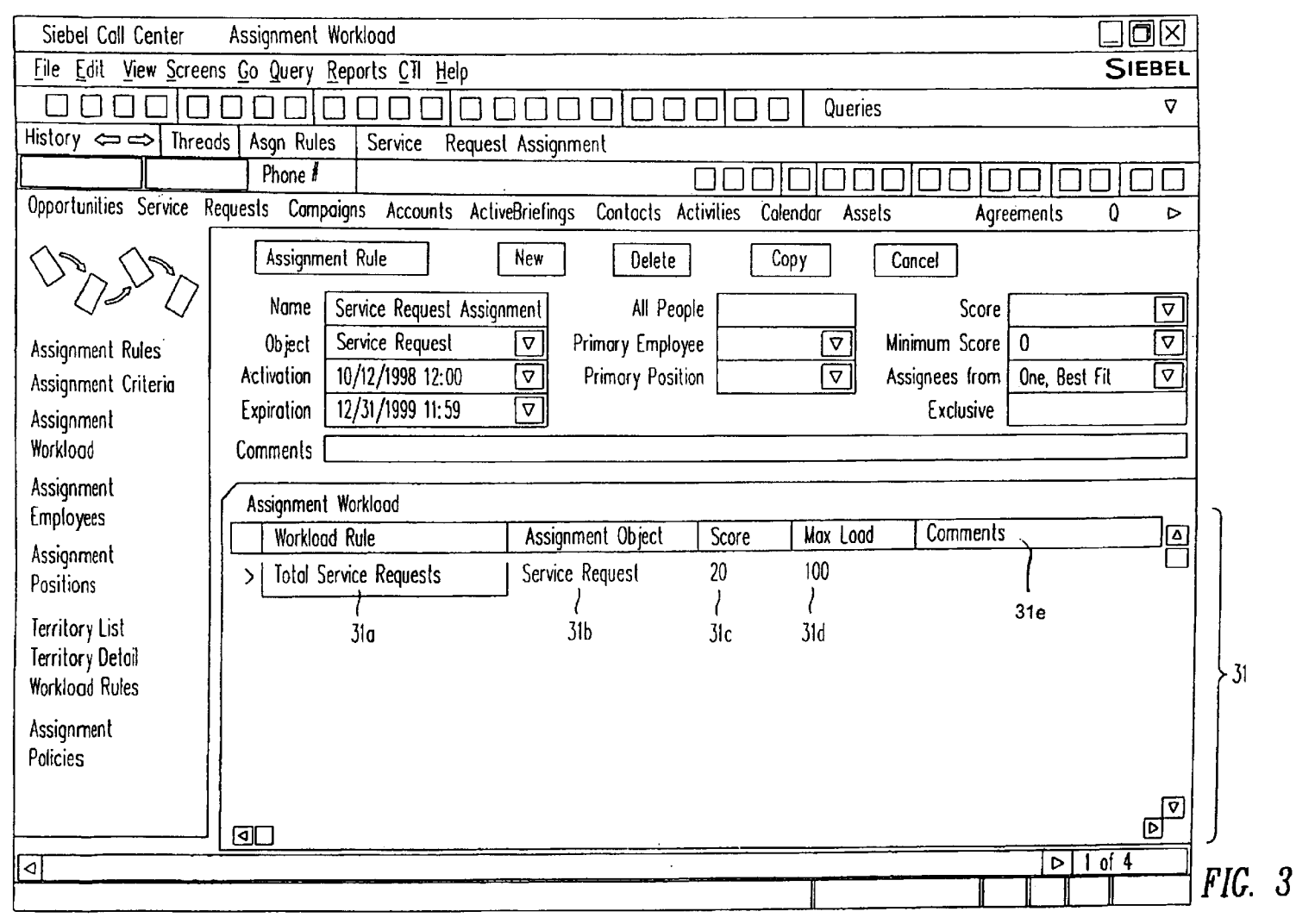
Figure 4:
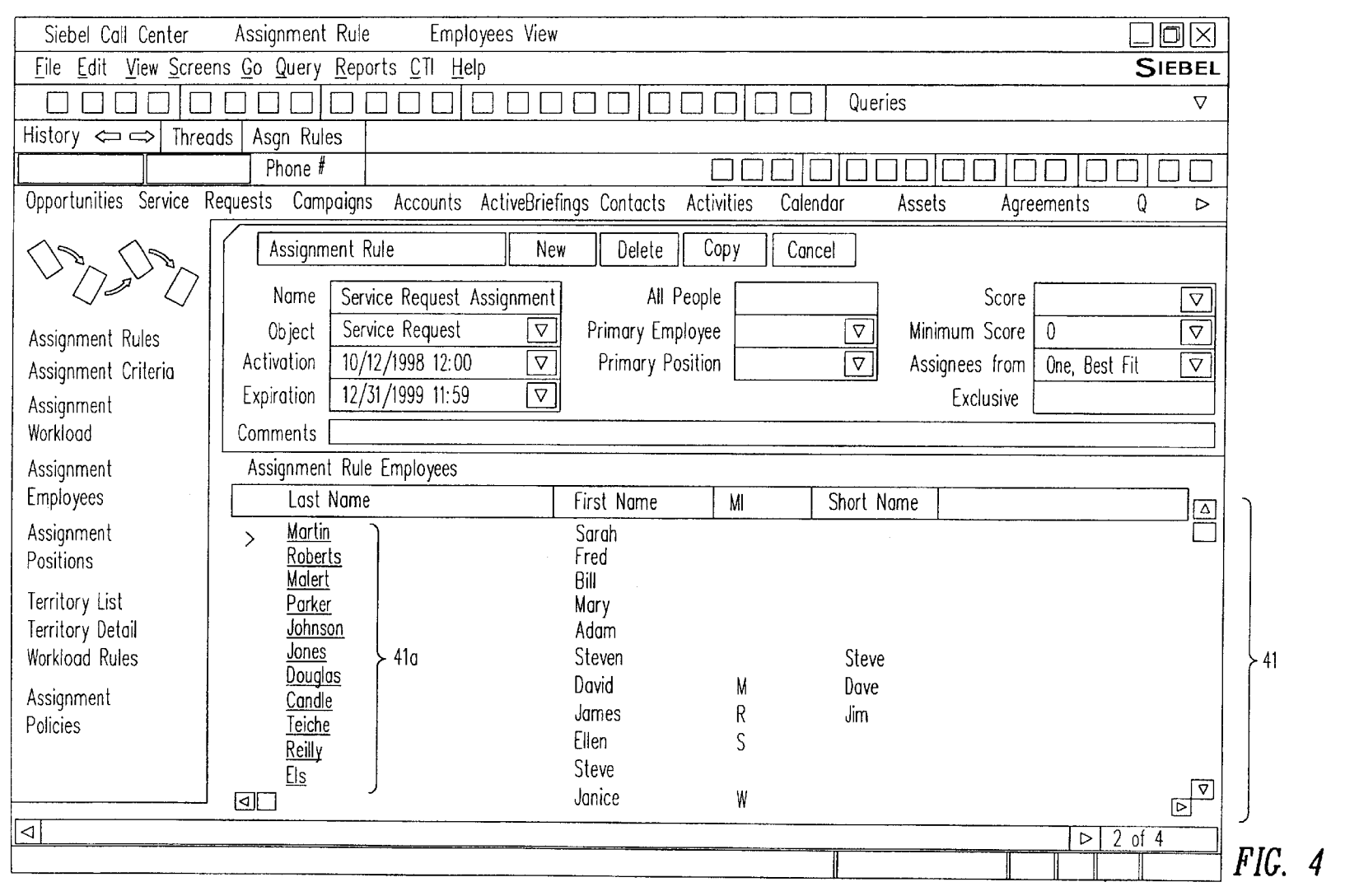
Figure 6:
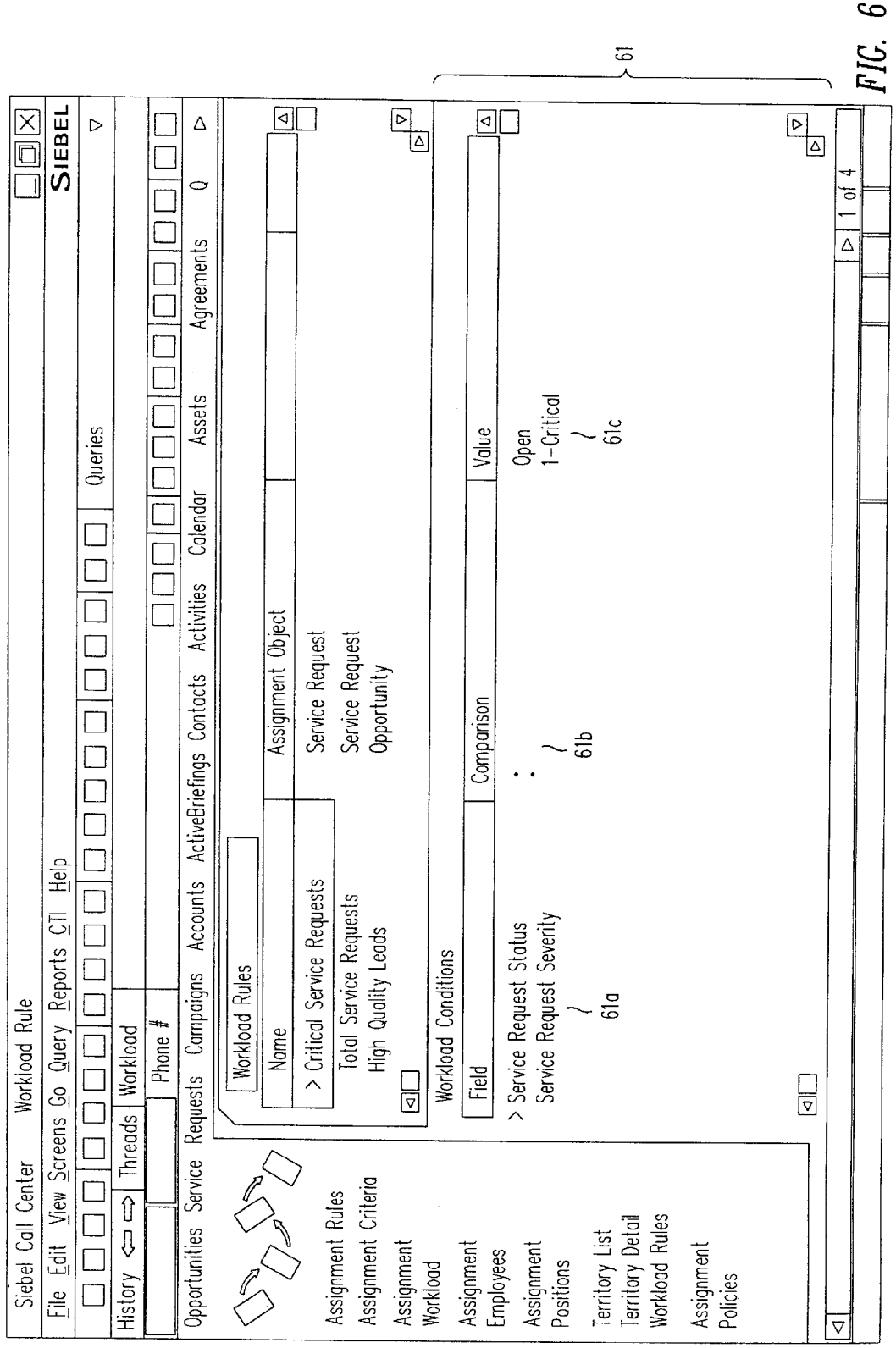
Figure 9:
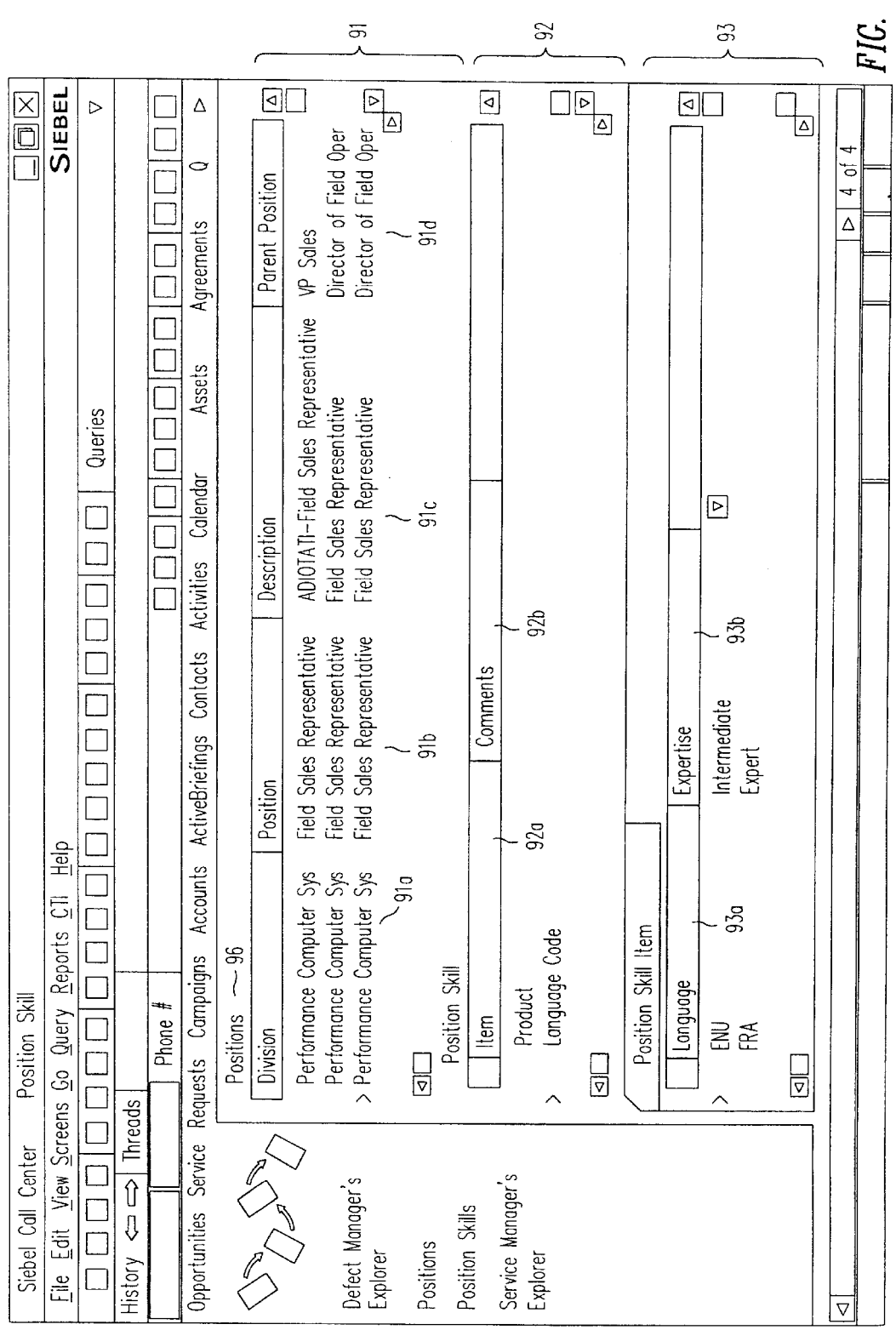
Figure 10:
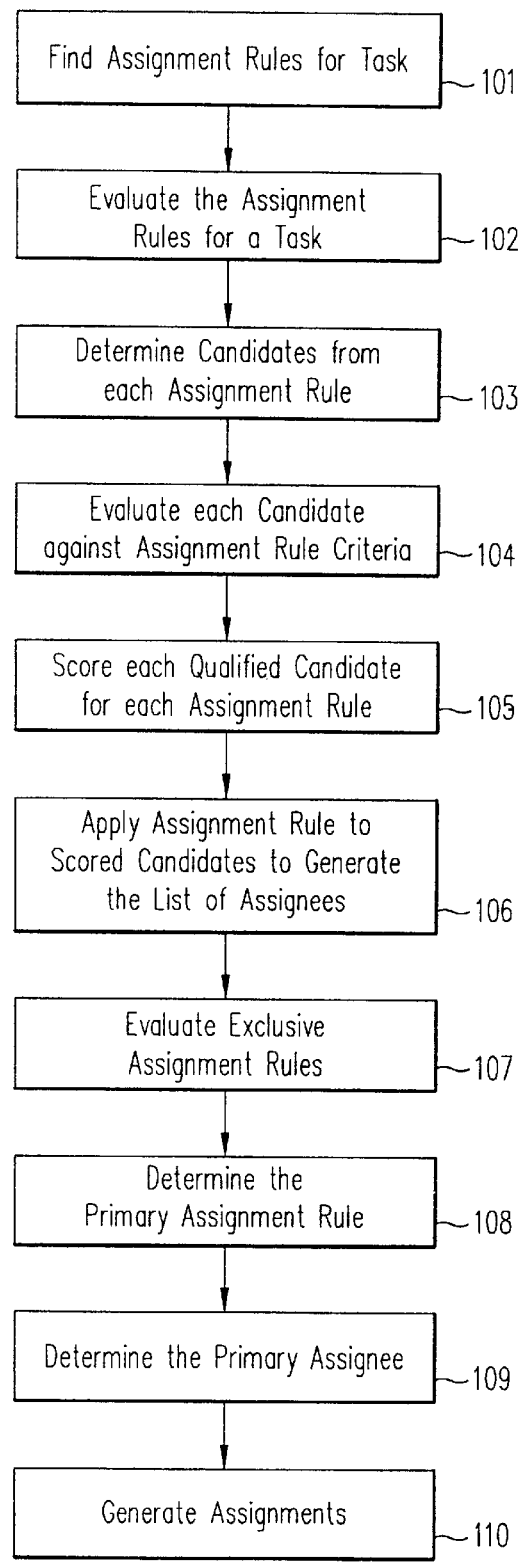

FIG. 1 illustrates the "Assignment Rules" view.
FIG. 2 illustrates the "Assignment Criteria" view.
FIG. 3 illustrates the "Assignment Workload" view.
FIG. 4 illustrates the "Assignment Employees" view.
FIG. 5 illustrates the "Assignment Positions" view.
FIG. 6 illustrates the "Workload Rules" view.
FIG. 7 illustrates the "Attribute Types" view.
FIG. 8 illustrates the "Employee Skills" view.
FIG. 9 illustrates the "Position Skills" view.
FIG. 10 is a flow chart of the Assignment Engine.

DETAILED DESCRIPTION OF THE INVENTION

The assignment manager method and system of our invention matches resources, such as employees and employee skill sets, with needs. This is carried out in a "Rules Based" system within a resource constrained environment. Resources, such as employees, are matched with constraints, such as skill sets, employee product expertise, language skills, workload, and employee availability, among others.

The assignment manager method and system of our invention provides management with the capability to optimally match resources, such as employees, with the needs of the business. More particularly, this invention has an integrated set of graphical user interfaces, a database management system, one or more databases (for example of resources and individual resource skill sets, and of requirements and skills required by the requirements), and a state engine which functions as a matching and optimization engine, and which may actually be a matching and sub-optimization engine. See FIG. 10 for a flow chart of the engine.

The graphical user interface includes panels, views, and screens for inputting and/or retrieving assignment rules, assignment criteria, assignment workload, assignment employees, assignment positions, workload rules, attribute types, employee skills, and position skills.

The graphical user interface is used by the systems administrator or assignment administrator to add, modify or delete assignment rules, assignment criteria, assignment criteria values, workload rules, calendar availability, CTI rules, geographic proximity rules, as well as to add, delete and modify employees and positions from assignment rules and add, modify and delete employee and position skill sets without required programming.

The graphical user interface transparently translates the administrator actions into SQL statements to appropriately modify the rules database, employee database and position database.

These screens and views are used to provide input to the assignment manager tool, and receive out put from the assignment manager tool.

Assignment rules are used to match the tasks to the assets available to carry out the those tasks, scoring the assets in proportion to their capability to carry out the tasks as determined by the assignment rules, applications of weights to the scores thus obtained, and ranking the assets according to the weighted scores. Various algorithms may be used by the assignment engine, illustrated in the flow chart of FIG. 10, to effect an optimal or sub-optimal assignment in a rules based, resource or asset constrained environment. By way of example, and not limitation, this may include linear programming.

The attributes of tasks which are to be matched are obtained from the database management system using complex queries, e.g., a multi-way join against the various tables contained in the definition of the task (e.g., Opportunity, Service Request).

This provides a list or enumeration of candidate assets (people), which may be ranked or arrayed to show the number of attributes that match the criteria, or to show scales or weightings of the attributes.

These utilitarian processes are accomplished by the interaction of various modules within the assignment manager method and system of our invention, which matches resources, such as employees, with constraints and needs, such as employee skill sets. The matching of resources with needs is carried out in a "Rule Based" system in order to stay within constraints. Resources managed by the assignment manager application include employees, positions, among others. Needs include skill sets, employee product expertise, language skills, service calls, sales calls, and sales opportunities, among others. Constraints include, for example, workload, employee availability, limitations on employee skill sets and product expertise, employee language skills, among others.

Assignments of tasks may be made to individual employees or to positions, as well as to individuals or teams. The potential list of candidate assignees may either be from the list of persons (employees or positions) associated with assignment rules using the graphical user interface or the list of potential candidate assignees may comprise the entire set of employees or positions in the system. Assignment rules may be configured to be mutually exclusive (e.g., exclusive sales territories or customer sets). The assignments may be made to "All" employees or explicit employees or positions. Assignments may be exclusive assignments, such as exclusive territories, or exclusive customer sets. And the assignment manager method and system of our invention may be configured to either remove or to preserve previous assignees or assignments.

The rule based assignment manager method and system of our invention incorporates various selection and matching rules. These rules may be "Best Fit" matching or "Random Fit" matching or "Mandatory Fit", with ranking of employees by, for example, weighted rankings, flexible scoring, minimum or threshold scores. The method and system of our invention allows for the use of inclusion and exclusion criteria. The workload assignment may be a configurable workload, and wild cards may be used.

Various assignment modes are incorporated into the assignment manager method and apparatus of our invention. These may include Interactive Assignment to provide real-time assignment. Alternatively, assignment modes such as Dynamic Assignment and provided and may be used to assign tasks dynamically.

The assignment manager method and system of our invention incorporate various modules. These include Assignment Manager, Workflow Manager, Calendar, Computer Telephony Integration (CTI), Employee Administration, Position Administration and Skills, among others.

Assignment Options.

The method and system of our invention will allow users to rank employees, positions, and sales territories and to assign the most knowledgeable, geographically desirable and accessible employee(s) or position(s) to handle tasks. The assignment can be of a single employee or position to a task; it can be based upon a best fit, a round robin or a random assignment. Alternatively, the assignment can be the assignment of multiple employees or positions per role to a task. The method and system of our invention allows a minimum score to be established, and enforces mandatory assignment.

The method and system of our invention can be set by the user to either remove previous assignments when generating new assignments for a task or to allow previous assignments to be continued.

The method and system of our invention allows both the automatic assignment of the optimal employee(s) or position(s) or viewing a ranked list of employees for manual assignment. However, when the assignment manager operates in the background, assignment always selects the optimal employee(s) or optimal position(s)

The method, system and program product of our invention allows the calculation of a primary employee or position from among the team of employees or positions select for assignment to a given task.

Scheduling Options.

The scheduling options and modules with the assignment manager method and system of our invention provide the option to automatically create a calendar activity for the scheduled assignment. The calendar activity is based on the earliest availability (within the constraints for the assignment rule) for the selected employee or position.

Employee and Position Attributes.

The employee and position attributes modules of the assignment manager method and system of our invention allow the user to easily define attributes for employees and positions. Additionally, pre-defined attribute types can be created that can or should include all the territory attributes in a Territory Assignment module or database, plus product, product line and skill attributes.

Attributes are used to match employee or position properties with aspects of the tasks to which they are being assigned.

Defining Assignment Rules.

Assignment Rules are implemented using the "Assignment Rules" view shown in FIG. 1, the "Assignment Criteria view shown in FIG. 2, and the "Assignment Workload" view shown in FIG. 3.

Each assignment process assigns employees or positions to a task based on any combination and weighting of the following criteria (different executions of assignment manager may use different combinations and weightings):

Assignment rules balance at least the following inputs: (1) Current workload (e.g., the number of "Open" service requests), (2) Product or product line expertise, (3) Geographic proximity (for field service representatives), (4) Availability (based on an employee's calendar and service calendar/work shift), (5) CTI (Computer-Telephony-Integration) Availability (available to take telephone calls); (6) Status (e.g., available, on vacation, in training), (7) Role (e.g., Engineer, Sales Representative, etc.), (8) Territory (e.g., City, State, Postal Code, Province, Area Code, Country Code, Country, SIC Code, Product, Product Line, Revenue, Lead Quality, Named Account), (9) Skills (e.g., French speaking( Technical Certifications), and (10) User defined values.

The assignment rules may be created by the end-user or included in the installation package. Those that are included in the installation package include assignment rules for the following tasks: (1) service requests, (2) opportunities, (3) contacts, and (4) accounts, (5) activities, (6) campaigns, and (7) product defects.

Additionally, the assignment rules modules allow administrators to specify system wide assignment rules to be used by agents or users when the Assignment Manager is invoked. These rules may have start and stop times (based on a 24 hour clock) When multiple assignment rules are relevant for the current time and the task being assigned, all relevant rules are evaluated, and the employees or positions are scored accordingly. The assignment rules modules also allow administrators to use "wildcards" in specifying assignment criteria.

The use of the assignment manager method and system of our invention in conjunction with an underlying database of, for example customer data, product data, and employee data allows assignment of employees or positions to hierarchical tasks, like accounts, to automatically assign the employee or position to all parent or child accounts (i.e., navigate the entire account hierarchy).

Invoking Assignment Manager.

The assignment manager method and system of our invention may be invoked from, for example an external API, a workflow manager such as Siebel Workflow Manager, a code command, such as Visual Basic or Siebel VB, from a Computer Telephony Integration application such as Siebel CTI (for inbound routing and transfer routing), or from a database client, such as Siebel Client. Assignment Manager may also be invoked by a user in real-time from an application, such as from the Siebel Client. Assignment Manager may be invoked and requested to be performed in the background (as a server based process).

The Assignment Manager application may be invoked automatically, as in being scheduled to occur on a periodic basis (e.g., assign all unassigned opportunities or service requests on an hourly or nightly basis). In this case Assignment Manager may work in the background. Assignment Manager may be scheduled to occur (or automatically be re-assigned) any time an important attribute of a task is changed.

In a further implementation of our invention, users are able to perform real-time assignment and simultaneous CTI transfer (both blind and consultative transfers). This may be enabled via a "Transfer on Assignment" user preference/option (pick list: None, Blind Transfer and Consultative Transfer).

In a further embodiment of our invention, the Assignment Manager application is able to perform assignment for a specific instance of a task or multiple instances of a task. This is the case where the task meets specific criteria (e.g., all unassigned service requests, all service requests assigned to a terminated employee, all service requests assigned to an employee who will be out sick or on vacation, all opportunities, etc.).

Architecture.

In a preferred exemplification of our invention, both real-time and background assignment use the same assignment engine. Assignment may take place on a disconnected client; however, this may be implemented by submitting a request to assign upon synchronization with the server.

In a particularly preferred exemplification of our invention, there is a single assignment engine process for both skills-based assignment (Siebel Assignment Manager) and territory assignment (Siebel Territory Assignment) The Assignment Manager and the Territory Assignment functions are invoked by calling the same process and passing similar types of parameters.

Screens.

The Assignment Administration application within client applications, as the Siebel Client, consists of several views: Assignment Rules, Assignment Criteria, Assignment Workload, Assignment Employees, Assignment Positions, Territory List, Territory Detail, Workload Rules and Assignment Policies. The Assignment Administration in Siebel Tools consists of Assignment Attributes, Assignment Attribute Columns, Assignment Item Type, Assignment Item Type Attribute, Workflow Task, Workflow Component and Workflow Component Column.

In this regard, it should be noted that "drill down" capability may be provided. For example, drill down from the Assignment Rules will navigate to the Assignment Criteria view. Drill down from the Assignment Workload view will navigate to the Workload Rules view.

Workflow Tasks will have seed data for Service Requests, Opportunities, Contacts, Accounts, Activities, Campaigns and Product Defects.

The Assignment Rules (alphanumeric) view of FIG. 1 shows the name of the assignment rule. FIG. 1 illustrates the "Assignment Rules" view. Ten assignment rules are shown in the central frame, from "Service Assignment Request" through "Test Report." The assignment rule for "Service Assignment Request" 11a is highlighted in the central frame 11, and expanded in the lower frame 12. The lower frame, 12, shows the inputs for "Name", 12a, "Object", 12b, "Activation", 12c, "Expiration", 12d, "Comments", 12e, eligible assignees, 13, ("All People" check box, 13a, "Primary Employee" by name, 13b, and "Primary Position" by identifier, 13c), scoring, 14, and the choice box for the assignment algorithm, 15. The Type (pick list) view shows the type of assignment rule, that is "One, Best Fit" assigns the single, best employee or position based on the assignment score One, while "Round Robin" assigns the next round robin employee from the assignment rule employee list. This option ignores scoring of all employees who meet the minimum score criteria. "One, Random" assigns a random employee or position from the assignment rule employee or position list. This option ignores scoring of all employees who meet the minimum score criteria. "All" Assigns all employees or positions with an assignment score above the minimum score. This is commonly used in territory assignment. "All, Must Assign" is the same as "All", however, it will assign a single employee with the highest score, even if it is less than the minimum score. The assignment rule "Multiple, One Per Role" is the same as "One, Best Fit", but one employee per each role is assigned to the task.

In addition, the Assignment Object is configured to select either an individual or team of employees from all the rules that assign employees based on the assignment types defined above.

Within the Assignment Rule is "Object" (MVG) which opens the Assignment Objects for which the rules are to be applied (e.g., Service Request, Opportunity).

The Assignment Rule further includes how wide a search is to be conducted, that is "All Employees" which checks scoring for all employees in the database, not just the ones defined in the "Assignment Employees" view, or "All Positions" which checks scoring for all positions in the database, not just the ones defined in the "Assignment Positions" view.

The Assignment Rule further includes "Score," which, if specified, defines the score that will result for all employees or positions in this rule if all the "required" criteria are met. In addition, there is a "Minimum Score"; each employee or position's total score for this rule must be above this score to be a valid match for this assignment rule.

A further aspect of the "Assignment Rules" is the "Additional Time Requirement" (numeric, in minutes)—which captures the additional transit time required for the scheduled task or activity. Although the task duration is passed when the Assignment Manager is invoked and the duration is used in creating a calendar activity, the additional time requirement, if specified, when combined with the duration indicates the total time that must be available for assignment. The total time must be available on the assignees calendar within the standard business hours for the employee and/or organization (system and user level preferences) This choice is only relevant if the check calendar checkbox is selected.

The "Assign All Children" assignment rule assigns the highest rated employee or position to all child tasks of the selected task. For example, it assigns the employee to this account and all sub-accounts.

The "Create Activity" schedules an activity on the assignee's calendar for this task.

The Assignment Criteria view is shown in FIG. 2.

FIG. 2 illustrates the "Assignment Criteria" view, with a first window for the "Assignment Rule" as in FIG. 1, a second window for "Assignment Criteria", 22, and a third window for "Values," 23. The "Assignment Criteria" window, 22, is used to select the particular comparison method for a criteria, 22a, the score, 22b, and inclusion/exclusion, 22c. The Values window, 23, shows discrete comparison values, 23a, and scoring.

The Assignment Criteria list applet has these fields in the following order: Criteria, Comparison Method, Score, Inclusion, Minimum Score, Required (checkbox—if this value is checked and this comparison results in a score of zero for an employee, the score for the assignment rule for that employee will also be zero), and Use Expertise (checkbox indicating whether to use expertise weighting criteria for a match on this comparison, e.g., when the product expertise matches, use the weight based on level of employee expertise). These expertise weightings are system level weightings which are used to weight scores for all the assignment criteria values. For instance, if an assignment criteria had a score of 15, and system level weightings for Expertise are 1, 2 and 3 for Novice, Intermediate and Advanced, the score for this criteria would be 5, 10 and 15, respectively.

The Assignment Workload is shown in FIG. 3. FIG. 3 illustrates the "Assignment Workload", 31, which shows the "Workload Rule" 31a, the "Assignment Object," 31b, scoring, 31c, the "Maximum Workload," 31d, and "Comments," 31e.

The Workloads list applet has these fields in the following order: Workload Rules (picklist from the Workload Rules view), Assignment task, and Score (numeric, the score for each workload rule is inversely proportional to the quantity of work for the employee or position)

Within our assignment manager method and system the Assignment Criteria types include Geographic Proximity, Calendar Availability, CTI Availability. In the Geographic Proximity type there is a score for geographic proximity. The Calendar Availability rule type indicates that the total time (duration and additional time requirement) must be available for the assignee within the standard business hours for the organization (system level preferences) CTI Availability indicates that the employee must be available for call transfers. The CTI Availability includes all of the following agent states: "Not Talking", "Not Busy", "Available", "Inbound Call Routing" and "Transfer Call Routing."

Assignment Criteria Values.

The Assignment Values applet is dynamic and based on the Criteria. In the example shown, Address is a Category that contains three attributes, (City, State, and Zip) Zip has been defined as Range Enabled so it displays in two columns (low and high)

Assignment Employees.

The Assignment Employees view shown in FIG. 4 is accessible from the Assignment Administration screen for users with System Administrator or Customer Service Manager responsibilities. FIG. 4 illustrates the "Assignment Employees" view, 41, and enumerates available employees for assignments, 41a.

This view lists all employees who are valid assignees for the given assignment rule.

The Employees applet is an association applet that links assignment rules with employees. The Employees list applet should be the "Employee List Applet". None of the fields are editable. There is a drill down on Last Name that navigates to the Employee Administration view.

The Assignment Positions view shown in FIG. 5 is accessible from the Assignment Administration screen for users with System Administrator or Customer Service Manager responsibilities. FIG. 5 illustrates the "Assignment Positions" view, 51, which lists the position, 51a, the division or site, 51b, the parent position, 51c, and the position type, 51d. This view lists all positions that are valid assignees for the given assignment rule. The layout of this view should be similar to the Assignment Employees view.

The Positions applet is an association applet that links assignment rules with positions. There is a drill down on Position that navigates to the Position Administration view.

The Workload Rules view shown in FIG. 6 is accessible from the Assignment Administration screen for users with Systems Administrator or Customer Service Manager responsibilities. This view is used for specifying the workload criteria for calculating employee or position workload. FIG. 6 illustrates the "Workload Rules" view, 61. It shows the "Field", 61a the "Comparison", 61b, and the "Value," 61c.

The Workload Rules list applet has columns in the following order: Name and Assignment Task.

The Workload Conditions form applet is a list view that has fields in the following order: Field, Comparison, Value. This applet behaves in the same fashion as the Workload Policies view, Conditions applet.

The Attribute Types view shown in FIG. 7 is used for defining the attribute types for both employees and positions. FIG. 7 illustrates the "Attribute Types" view. The "All Attributes" frame 71 shows the Attribute, 71a, the Type, 71b, the Picklist, 71c, the Object Mapping, 71d and the Use Range, 71e. The "All Objects" frame, 73, shows the Objects, 73a, and the Column, 73b. The "All Categories" view, 75, shows the Category, 75a, and the Attributes, 75b. This information defined in this view may be defined and viewed in such application products as Siebel Tools or Siebel Client. The picklist field specifies the pick list to use to display and validate the valid values for the Criteria Values.

The Object Mapping field stores the column in the Workflow Object which must be matched with the specified Employee or Position attribute type for that factor to receive a non-zero score. The Object Mapping field will display an MVG pop-up applet as shown below.

The All Categories view is used to define new Attributes that consist of other attributes. For instance, Full Address may consist of Street Address, City, State and Zip.

The Employee Skills view shown in FIG. 8 and the Position Skills view shown in FIG. 9 are both accessible from the Application Administration screen, and allow administrators to assign attributes and skills to employees and positions. These views are both accessible by the System Administrator, Customer Service Manager and Call Center Administrator responsibilities. FIG. 8 illustrates the "Employee Skills" view, 81. It includes fields for the Skill, 81a, and the Skill Items, 81b, with columns for the specific item, 81c, and the level of expertise, 81d.

FIG. 9 illustrates the "Position Skills" view, 91, with "Positions," 91a, (subdivided in "Division," 91a "Position," 91b, "Description," 91c, and "Parent Position," 91d), "Position Skills," 92, with the skill item 92a and comments 92b, and "Position Skill Items" (further subdivided into, for example, "Language," 93a, "Expertise," 93b).

The Attribute Type is a pick list of attribute types on the Attribute Types view. The Match Value is an MVG based on the Attribute Type specific Picklists. The high and low value values are Attribute Type specific Picklists. The Expertise is a picklist of expertise levels.

Calling the Assignment Manager.

An Assignment button will be displayed on any Siebel view or on an application toolbar. An Assignment command will be accessible from the Edit menu with a shortcut key, such as <Ctrl+M>.

When a single row is selected, it will be assigned when the Assignment command is invoked. When multiple rows are selected, they will all be assigned when the Assignment command is invoked. The assignment engine may be called with any of the following parameters (some of these parameters may not be passed to the engine, but may just be attributes of the task): Object ID, Batch ID (any object with the specified batch number), Assignment Set (single, all unassigned, all), Object Type, Earliest Date/Time (for the earliest date and time that an employee must have calendar availability for the task), Latest Date/Time (for the latest date and time that an employee must have calendar availability for the task), Duration.

The assignment engine can be called to assign a single task, all unassigned tasks, all tasks in a batch, or all tasks, either through the client, a workflow manager such as the Siebel Workflow Manager, a CTI Bridge, a Visual Basic, JavaScript, or Visual C++ command or an external API.

The assignment engine will score employees and positions for assignment based in each factor specified. The criteria are in addition to the skill matching.

Calendar Availability—an employee must have calendar availability to perform the task. This is based on the assignment rule, Earliest Start Time, Latest End Time and the sum of Duration and Additional Time Required. If the individual is not free, the total score for the employee will be zero regardless of the results of the other factors.

Geographic Proximity—based on a system profile (Maximum Geographic Proximity), the system will generate a score that is linearly inversely proportional between the Geographic proximity weight and zero. For instance, for a weight of 10 and a maximum geographic proximity of 100 miles, the score for this factor for an employee who is 60 miles away from the selected task is 4. If Geographic Proximity Weight is zero, this factor is not used.

Workload—for each Workload Rule specified, the number of tasks assigned to that employee that meet all of the workload condition criteria is calculated. This number is then reduced to the level of the maximum load. This resulting number is used to generate a score that is inversely proportional between the workload rule weight and zero. For instance, if the workload rule is for Unassigned, Critical Service Requests, and the maximum load for this rule is 10 and the weight for this Workload is 20, then an employee with a load of anything 10 or greater will receive a score of zero, an employee with a load of 2 will receive a score of 16.

Attribute Match—For each Attribute Match Assignment Rule specified, the criteria will be evaluated and if the condition is true, the score will equal the weight specified, otherwise the score will be zero. If the condition is required, the total score for that employee or position will be zero.

Use Expertise—For each "Attribute Match" condition where "Use Expertise" is selected, the score for that condition will be adjusted based on the values for weighting specified for each expertise. For the employee column that is matched, the expertise for that attribute type must also be analyzed. For example, if an assignment rule is specified for a product (product expertise) match with a score of 15, and expertise weightings of Expert, Intermediate and Novice are 3, 2 and 1 respectively, the resulting scores for this factor would be 15, 10 and 5, respectively.

CTI Availability—if this checkbox is enabled, an employee must be available via CTI. If the individual is not free, the total score for the employee will be zero regardless of the results of the other factors.

The total score for an employee or position will be a sum of the scores for each individual criteria, modified by the "required" assignment rules that override the total score. The highest score will represent the most likely individual or individuals for assignment.

When called from some applications, such as, the Siebel Client, the assignment engine will either assign the highest scoring employee or display a ranked list of employees, depending on whether the Auto-Assign option is specified for the user from the Options dialog. If auto-assign is not selected, the first user's row (with the highest total score) will be highlighted and the Pick button will be selected, so the user only needs to press Enter to select the most likely candidate. The columns should be sortable just by clicking on the column header (both ascending and descending) For "Multiple" assignment tasks, multiple employees or positions may be selected and/or picked. For positions, the primary employee for each position will be displayed in this dialog.

When calling the assignment engine using Auto-Assign or selecting an employee from the pop-up list, the assignee will automatically be assigned to the task submitted for assignment. If submitted from an application such as Siebel client, the selected employee that was assigned will be visible in the assignee field of the task that was submitted for assignment. For example, if assigning a service request, the assignee selected by Assignment Manager will be displayed in the Owner field for that service request.

Agents can use the Assignment Manager method and system of our invention to find the best-suited employee to respond to a task. The application will either automatically assign the best fit or display a ranked list of employees for selection. The Agent will be able to communicate who the new owner of the task is while conversing with a caller on the telephone.

Assignment Engine

This section describes the assignment engine, including the methodology and scoring used by the assignment engine to generate an assignment (such as a service technician or a sales representative) for a given task (such as a service request or a sales opportunity) The assignment engine has the high level flow chart shown in FIG. 10, and described herein below.

1. Find assignment rules for task. This operation is illustrated in element 101. The first step is finding all of the assignment rules to be evaluated for the task (service request or sales opportunity) to receive an assignee (service technician or sales representative). Tasks can be assigned to assignment rules by making an entry in the Task Field of the Assignment Rule view shown in FIG. 1. Note that if an assignment rule does not contain any assigned tasks, then the assignment rule is deemed to be relevant for all tasks.

2. Evaluate The Assignment Rules for A task. This operation is illustrated in element 102. The Assignment Engine next evaluates each criteria to find all assignment rules that satisfy a particular task's attributes using "Compare to Object" criteria. To be noted is that if a criteria indicated as "Required" does not satisfy the object's attributes, the task will not be evaluated against this rule.

3. Determine Candidates From Each Assignment Rule. This operation is illustrated in element 103. For each assignment rule that satisfies Step 2, above, that is, for each assignment rule that satisfies the task's attributes, determine a list of candidates relevant to the assignment rule.

a. If the task uses "position based assignment", then the Candidate List will contain the positions registered in the Assignment Positions View of FIG. 5.

b. If the task uses "employee based assignment," then the candidates list will contain the employees registered in the Assignment Employees view of FIG. 4.

c. If the "All People" flag is checked in the "Assignment Rule" view of FIG. 1, then the candidates list will contain all of the registered positions or employees in the environment.

4. Evaluate Each Candidate Against Assignment Rule Criteria. This operation is illustrated in element 104. Each candidate will be evaluated as follows:

a. Between a Person and a task: The rule is to remove all candidates that do not satisfy all required criteria that use the "Compare Object to Person" comparison method. This criteria ensures that the "qualified" candidates possess the required skills for this task.

b. To Person. The "To Person" rule removes all candidates that do not satisfy all required criteria that use the "Compare to Person" comparison. This criteria ensures that only qualified candidates with the required skills are evaluated for this assignment rule.

c. Workload. The "Workload" rule removes all candidates that have a workload greater than the maximum workload specified in the Assignment Workloads View of FIG. 6.

To be noted is that candidates fail the criteria if they match the specific individual criteria but fail to meet the minimum score required. Also to be noted is that candidates that fail the criteria that are marked as "Required" will not be evaluated against this criteria.

5. Score Each Qualified Candidate for Each Assignment Rule. This operation is illustrated in element 105. Scoring for each assignment is based on the sum of:

a. Sum of all assignment criteria that satisfy the task's attributes. This score is calculated using the criteria score and the highest score of matching criteria values.

b. Expertise Weight Score. The Expertise Weight Score is the sum of all matching criteria values weighted by expertise. Expertise weight can be defined in the Order Column of the List of Views Screen shown.

c. Score For the Candidate. The score for the candidate may be specified in the Assignment Employees View of FIG. 4 or the Assignment Positions view of Figure of FIG. 5.

d. Workload Score.

e. Calendar availability score f. CTI availability score.

g. Geographic proximity score.

6. Apply Assignment Rule To Scored Candidates To Generate The List of Assignees. This operation is illustrated in element 106. This step uses the assignment rule type to eliminate some candidates and determine a final list of assignees. The following assignment rules may be used:

a. All, Above Minimum. This rule keeps all candidates with an assignment greater than or equal to the assignment rule's minimum score.

b. All, Must Assign. This is the same as the "All, Above Minimum" except that at least one candidate will be assigned even if all candidates fail to meet the minimum score.

c. One, Random. Choose a random candidate among those above the minimum score from this assignment rule.

d. One, Best Fit, This assignment rule keeps the single, best qualified candidate among those above the minimum score for this assignment rule.

7. Evaluate Exclusive Assignment Rules. This operation is illustrated in element 107. If at least one assignment rule that satisfies Step 2, "Evaluate The Assignment Rules for A task," is marked "Exclusive", choose the assignees with the highest scoring assignment rule, and eliminate all other assignees. If more then one "exclusive assignment" rule yields the same score, then assign the task to the default employee for employee-based assignment or the default-based assignment.
8. Determine The Primary Assignment Rule. This operation is illustrated in element 108. The "Primary Assignment Rule" is the highest scoring assignment rule.
9. Determine The Primary Assignee. This operation is illustrated in element 109. Determine the primary assignee from the primary assignment rule. If the primary assignment rule does not assign a valid assignee, then choose the next highest scoring assignment rule, until an assignee can be assigned.
   a. For tasks that use employee-based assignment, set the primary assignee to the primary employee selected in the Assignment Employee view of FIG. 4. If the selected primary employee is not an assignee that satisfies Step 6, select the highest scoring employee of the highest scoring assignment rule. If no assignment rules matched or no employees matched, then assign the default employee as specified in the Assignment Tasks view in Siebel Tools.
   b. For tasks that use position based assignment, set the primary assignee to the primary position selected in the Assignment Position views of FIG. 5. If the selected primary employee is not an assignee that satisfies Step 6, select the highest scoring position of the highest scoring assignment rule. If no assignment rules matched or no positions matched, then assign the default position as specified in the Assignment Tasks view in Siebel Tools.
10. Generate Assignments. Write assignments to the task This operation is illustrated in element 110.
    a. Write the primary assignment rule and primary assignee to the task's primary table.
    b. For team based tasks, write all assignees to the task's team and assignment rule team tables.

The assignment manager method and system of our invention is capable of use in several different applications. First, while an agent or dispatcher is on-line looking at a task (such as, an opportunity, a service request, an account, etc.), he or she can assign it to someone else in real time. This is desirable when, for example, the service representative needs to easily have that task assigned, automatically, to the appropriate individual with the appropriate skill set and/or product knowledge.

Alternatively, unassigned service tasks may be automatically monitored by the Assignment Manager and automatically assigned appropriately, to another employee, agent, or service technician, if and when necessary.

Using the assignment manager method and system of our invention, administrators may submit batches of tasks for reassignment. For instance, when an employee is promoted, all of their service requests heretofore serviced by the newly promoted employee may need to be reassigned.

Lastly, when the Assignment Manager tool of our invention is used in a remote or mobile client, a request that is submitted that is submitted at one point in time is processed at a later point in time, when the mobile user synchronizes with the server.

Manager's View and Use

Managers will set-up and refine assignment rules to provide load balancing and resource allocation across an organization.

While the invention has been described with respect to certain preferred embodiments and exemplifications, it is not intended to limit the scope of the invention thereby, but solely by the claims appended hereto.

We claim:
1. A method in a computing system for assigning resources to tasks in a rule-based, resource constrained system, the method comprising:
   under control of the computing system,
   receiving indications of multiple tasks, each task being of one of multiple task types and having multiple task attributes that specify constraints on which resources are able to perform the task;
   receiving indications of multiple resources each having multiple resource attributes, the resource attributes of a resource describing aspects of the resource that affect ability of the resource to perform tasks;
   receiving indications of multiple distinct assignment rules that are each associated with one of the task types, each assignment rule able to individually assess whether a resource is capable of performing a task of the associated task type; and
   using the assignment rules to assign resources to tasks by, for each of the tasks,
      selecting one or more of the assignment rules that are associated with the task type to which the task belongs; and
      using the selected assignment rules to assess whether resources are capable of performing the task based upon the resource attributes of the resources and the task attributes of the task, the assessing by determining for each of one or more resources whether the resource attributes of the resource indicate that the resource satisfies the constraints of the task attributes for that task.

2. The method of claim 1 wherein each of the assignment rules have associated criteria for use in evaluating resources, and wherein the using of the selected assignment rules includes, for each of the tasks to which resources are assigned:
   determining for each of the selected assignment rules any qualified candidate resources that satisfy the criteria associated with that assignment rule;
   using the selected assignment rules to score the qualified candidate resources and generate a list of assignee resources;
   selecting a primary assignee resource from the generated list based at least in part on the scores; and
   generating assignments of one or more resources to the task such that the assigned resources include the primary assignee resource.

3. The method of claim 2 wherein the selecting of the assignment rules that are associated with the task type for the task includes finding all assignment rules available for use with the task and evaluating the found assignment rules with respect to the task attributes for the task.

4. The method of claim 2 wherein the selected assignment rules include all assignment rules that are associated with the task type of the task.

5. The method of claim 2 wherein the determining of the qualified assignment candidate resources is based upon one or more of:
   i. position based assignment;
   ii. employee based assignment;
   iii. all people assignment;
   iv. task rules matching task attributes with criteria in the rules;

v. "compare task to person" rules matching task attributes with employee or position attributes and/or skills vi. person rules matching person's attributes and/or skills with criteria in rules;

vii. workload rules;

viii. calendar availability rules;

ix. CTI availability rules; and x. geographic proximity rules.

6. The method of claim 2 wherein the assignment rule criteria are one or more of:

i. composite criteria having multiple attributes;

ii. criteria having a finite range;

iii. criteria having one or more wild cards; and iv. criteria having an expertise code.

7. The method of claim 2 wherein the determining of the qualified assignment candidate resources includes evaluating each assignment candidate based upon one or more of:

i. removing all candidates that do not satisfy all required criteria; and ii. removing all candidates that have a workload greater than a pre-assigned maximum workload.

8. The method of claim 2 comprising scoring each qualified candidate for each assignment rule based upon one or more of:

i. the sum of all assignment criteria that satisfy the task's attributes;

ii. the expertise weight score of the candidate;

iii. the score of the candidate; and iv. the workload score.

9. The method of claim 2 wherein generating of a list of assignee resources for an assignment rule is based upon one or more of:

i. keeping all candidates with an assignment score greater than or equal to a minimum score of the assignment rule;

ii. keeping all candidates having an attribute meeting the assignment rule;

iii. choosing a random candidate meeting the assignment rule; and iv. choosing the candidate having the highest assignment score.

10. The method of claim 2 comprising determining the highest scoring assignment rule as a primary assignment rule.

11. The method of claim 10 comprising selecting as the assignee the candidate assignee having the highest score for the primary assignment rule.

12. The method of claim 10 comprising writing the primary assignment rule and the primary assignee to a database table for the task.

13. The method of claim 2 comprising assigning individuals to tasks in one or more of a one best fit, a random fit, or a round robin fit.

14. The method of claim 2 comprising assigning teams to tasks.

15. The method of claim 14 comprising determining a primary person in the team.

16. The method of claim 2 comprising matching the closest fitting assignee to the task.

17. The method of claim 1 comprising configuring the task attributes.

18. The method of claim 1 comprising extending the task attributes.

19. The method of claim 1 comprising dynamically defining assignment rules.

20. The method of claim 1 comprising assigning tasks in the background.

21. The method of claim 1 comprising assigning tasks in real time and interactively.

22. The method of claim 1 comprising assigning tasks dynamically.

23. The method of claim 2 further comprising identifying at least one exclusive assignment rule; and excluding one or more candidates based on the identification of at least one exclusive assignment rule.

24. The method of claim 1 wherein the multiple task types include service requests, opportunities, contacts, accounts, activities, campaigns and product defects.

25. The method of claim 1 wherein the receiving of the indications of the multiple tasks and of the multiple resources includes searching one or more databases that store information about the tasks and the resources.

26. The method of claim 1 wherein the received indications of the multiple resources include indications of the resource attributes of the resources, and further comprising retrieving one or more of the resources based upon the indicated resource attributes.

27. The method of claim 2 wherein the scoring of the qualified candidate resources includes scoring each qualified candidate for each selected assignment rule.

28. The method of claim 2 wherein the selecting of the primary assignee resource includes determining a highest scoring of the assignment rules and determining a primary assignee resource from the generated list based on that assignment rule.

29. A system for assigning resources to tasks, said system having:

one or more databases that store indications of resources each having multiple resource attributes describing aspects of the resource that affect ability of the resource to perform tasks, that store indications of tasks that are each of one of multiple task types and that each have multiple task attributes reflecting constraints on which resources are able to perform the task, and that store assignment rules that are each associated with one or more task types and are for assessing whether a resource is capable of performing a task of one of the associated task types by determining whether the resource attributes of the resource indicate that the resource has the ability to satisfy the constraints of the task attributes for that task;

a database management system able to retrieve the stored indications for resources based upon their resource attributes and/or able to retrieve the stored indications for tasks based upon their tasks attributes; and an assignment engine able to assign resources to tasks based upon the resource attributes, the task attributes, and the assignment rules, the assigning based on selecting assignment rules for tasks of a task type based on those assignment rules being associated with that task type and on using the selected assignment rules to assess whether the resources are capable of performing the tasks of that task type.

30. The system of claim 29 wherein the assignment engine is configured to perform the assigning of the resources to the tasks by:

a. receiving as input indications of tasks and/or task attributes, indications of resources and/or resource attributes, and indications of assignment rules;

b. retrieving tasks that match any indicated task attributes from the one or more databases that store tasks;

c. retrieving resources that match any indicated resource attributes from the one or more databases that store resources;

d. retrieving the indicated assignment rules from the one or more databases that store assignment rules; and e. assigning resources to tasks by the assignment engine based upon the resource attributes, the task attributes, and the assignment rules by, for each of one or more assignment rules associated with a task type, determining for each of one or more resources whether the resource attributes of the resource indicate that the resource satisfies the constraints of the task attributes for each of one or more tasks of the associated task type.

31. The system of claim 30 wherein the system is further adapted for:

a. finding assignment rules for a task;

b. evaluating the assignment rules for a task with reference to attributes of the task;

c. determining at least one candidate resource for each assignment rule that satisfies the task's attributes from each assignment rule;

d. evaluating each candidate against assignment rule criteria;

e. scoring each qualified candidate for each assignment rule;

f. applying the assignment rule to scored candidates to generate a list of assignees;

g. determining the highest scoring assignment rule;

h. determining the primary assignee from the highest scoring assignment rule; and i. generating assignments of resources to tasks.

32. The system of claim 31 wherein the system is further adapted to evaluate all of the assignment rules that satisfy a particular task's attributes.

33. The system of claim 32 wherein the system is further adapted to determine assignment candidates based upon one or more of:

i. position based assignment;

ii. employee based assignment;

iii. all people assignment;

iv. task rules matching task attributes with criteria in the rules;

v. "compare task to person" rules matching task attributes with employee or position attributes and/or skills;

vi. person rules matching person's attributes and/or skills with criteria in rules;

vii. workload rules;

viii. calendar availability rules;

ix. CTI availability rules; and x. geographic proximity rules.

34. The system of claim 33 wherein the assignment criteria are one or more of:

i. composite criteria having multiple attributes;

ii. criteria having a finite range;

iii. criteria having one or more wild cards; and iv. criteria having an expertise code.

35. The system of claim 31 wherein the system is further adapted to evaluate each assignment candidate based upon one or more of:

i. removing all candidates that do not satisfy all required criteria; and ii. removing all candidates that have a workload greater than a pre-assigned maximum workload.

36. The system of claim 31 wherein the system is further adapted to score each qualified candidate for each assignment rule based upon one or more of:

i. the sum of all assignment criteria that satisfy the task's attributes;

ii. the expertise weight score of the candidate;

iii. the score of the candidate; and iv. the workload score.

37. The system of claim 31 wherein the system is further adapted to generate a list of assignees based upon one or more of:

i. keeping all candidates with an assignment score greater than or equal to the assignment rules' minimum score;

ii. keeping all candidates having an attribute meeting the assignment rule;

iii. choosing a random candidate meeting the assignment rule; and iv. choosing the candidate having the highest assignment score.

38. The system of claim 31 wherein the system is further adapted to determine the highest scoring assignment rule as a primary assignment rule.

39. The system of claim 38 wherein the system is further adapted to select as the assignee the candidate assignee having the highest score for the primary assignment rule.

40. The system of claim 38 wherein the system is further adapted to write the primary assignment rule and the primary assignee to the task's table.

41. The system of claim 31 wherein the system is further adapted for assigning individuals to tasks in one or more of a one best fit, a random fit, or a round robin fit.

42. The system of claim 31 wherein the system is further adapted for assigning teams to tasks.

43. The system of claim 42 wherein the system is further adapted for determining a primary person in the team.

44. The system of claim 31 wherein the system is further adapted for matching the closest fitting assignee to the task.

45. The system of claim 30 wherein the system is further adapted for configuring the tasks.

46. The system of claim 30 wherein the system is further adapted for extending the tasks.

47. The system of claim 30 wherein the system is further adapted for dynamically defining assignment rules.

48. The system of claim 30 wherein the system is further adapted for assigning tasks and tasks in the background.

49. The system of claim 30 wherein the system is further adapted for assigning tasks in real time and interactively.

50. The system of claim 30 wherein the system is further adapted for assigning tasks dynamically.

51. The system of claim 31 wherein the system is further adapted for:

identifying at least one exclusive assignment rule; and excluding one or more candidates based on the identification of at least one exclusive assignment rule.

52. A computer-readable medium whose contents cause a computing device to assign resources to tasks of multiple task types, by repeatedly performing a method comprising:

receiving an indication of a task that has multiple task attributes representing constraints on which resources are able to perform the task, the task being of one of the multiple task types;

identifying multiple distinct assignment rules that are each associated with the indicated task by selecting assignment rules that are defined for the one task type to which the indicated task belongs, each of the assignment rules able to assess whether a resource is capable of performing tasks of that one task type so as to each individually identifying resources capable of performing the indicated task;

using the multiple identified assignment rules for assigning resources to tasks by, for each of the identified assignment rules, identifying multiple candidate resources that each possess sufficient capabilities for performing the indicated task to meet a minimum threshold, each of the candidate resources having multiple resource attributes that describe aspects of the resource affecting ability of the resource to perform tasks; and assessing for each of the candidate resources a degree of ability to perform the indicated task; and selecting at least one of the candidate resources to perform the indicated task based at least in part on the assessed degrees of ability.

53. The computer-readable medium of claim 52 wherein the assessing of the degrees of ability of the candidate resources includes:

scoring each candidate resource for each identified assignment rule; and generating a list of assignee resources by applying one or more of the identified assignment rules to the scored candidate resources.

54. The computer-readable medium of claim 52 wherein the selecting of the candidate resources to perform the indicated task includes:

determining a highest scoring of the identified assignment rules;

determining a primary assignee resource from the candidate resources associated with the highest scoring assignment rule; and assigning at least the determined primary assignee resource to the indicated task.

55. The computer-readable medium of claim 52 wherein the candidate resources are personnel, and wherein the identifying of the multiple candidate resources that each possess sufficient capabilities for performing the indicated task includes considering multiple factors from a group including skills of the personnel, product expertise of the personnel, current availability of the personnel, workload of the personnel, and location of the personnel.

56. The computer-readable medium of claim 52 wherein the assessing of the degrees of ability of the candidate resources includes ranking the candidate resources based on their relative ability to perform the indicated task.

57. The computer-readable medium of claim 52 wherein the task relates to responding to a sales opportunity, and wherein the candidate resources are each a distinct salesperson who can respond to the sales opportunity.

58. The computer-readable medium of claim 52 wherein the task relates to responding to a received service call, and wherein the candidate resources are each a distinct support person who can respond to the service call.

59. The computer-readable medium of claim 52 wherein the selecting of the candidate resources to perform the indicated task includes selecting a team of multiple people to jointly perform the indicated task.

60. The computer-readable medium of claim 52 wherein the selecting of the candidate resources to perform the indicated task includes selecting a job position to perform the indicated task such that the job position does not yet have an associated individual.

61. The computer-readable medium of claim 52 wherein the indication of the task is received interactively from a user, and wherein the assigning of the resources to the tasks using the multiple identified assignment rules is performed in response to the receiving of the indication.

62. The computer-readable medium of claim 52 wherein the indicated task is of a predefined type, and including, before the receiving of the indication of the task, defining the multiple assignment rules based on information supplied by a user, associating the defined rules with the predefined type of task, and storing the defined assignment rules for later use in assigning resources to tasks of the predefined type.

63. The computer-readable medium of claim 52 wherein the computer-readable medium is a memory of a computing device.

64. The computer-readable medium of claim 52 wherein the computer-readable medium is a data transmission medium transmitting a generated data signal containing the contents.

65. The computer-readable medium of claim 52 wherein the contents are instructions that when executed cause the computing device to perform the method.

66. The computer-readable medium of claim 52 wherein the identifying of the multiple candidate resources includes:

evaluating the identified assignment rules with reference to the task attributes of the task;

determining at least one potential candidate resource for each assignment rule that satisfies the task's attributes from each assignment rule;

evaluating each potential candidate resource against assignment rule criteria; and selecting the identified candidate resources from the potential candidate resources based at least in part on the evaluating.

67. A computer-implemented method for assigning resources to tasks, comprising:

under control of a computing system, receiving indications of multiple distinct types of tasks;

for each of the multiple task types, defining one or more assignment rules that are associated with the task type based on input received from a user, each of the assignment rules having a defined mechanism for assessing whether a resource is capable of performing tasks of the task type; and after the defining of the assignment rules, repeatedly assigning resources to tasks by, receiving an indication of a task;

determining the type of the indicated task;

identifying the defined assignment rules that are associated with the determined task type;

using the identified assignment rules to assess multiple resources to determine whether those resources are capable of performing the indicated task; and selecting one or more of the multiple resources for the indicated task based at least in part on the assessments of those resources.

68. The method of claim 67 wherein each of the tasks have task attributes specifying constraints on which resources are able to perform the task, and wherein each of the resources have resource attributes describing aspects of the resource that affect ability of the resource to perform tasks.

69. The method of claim 67 wherein at least some of the task types have multiple associated assignment rules, and wherein each of the multiple associated assignment rules for a task type have distinct criteria for assessing resources.

70. The method of claim 67 wherein the using of the identified assignment rules to assess the multiple resources to determine whether those resources are capable of performing the indicated task includes ranking at least some of the multiple resources based on a degree of match between the resources and criteria for performing the indicated task.

* * * * *